United States Patent Office 3,473,457
Patented Oct. 21, 1969

3,473,457
VIEWFINDER FOR CAMERAS WITH OPTICAL PICKUP FROM FILM SURFACE
Anton Sziksay, Bucharest, Rumania, assignor to Comitetul de Stat Pentru Cultura Si Arta, Bucharest, Rumania, a corporation of Rumania
Filed Nov. 1, 1966, Ser. No. 591,255
Int. Cl. G03b *19/12*
U.S. Cl. 95—42     4 Claims

ABSTRACT OF THE DISCLOSURE

A viewfinder for cameras having an objective system casting an image upon a photographic layer (film) which further includes an objective-viewfinder lens with magnifying properties and an optical path using reflective surfaces for picking up the image cast on the film and delivering it to the viewfinder objective.

---

Figure 1:
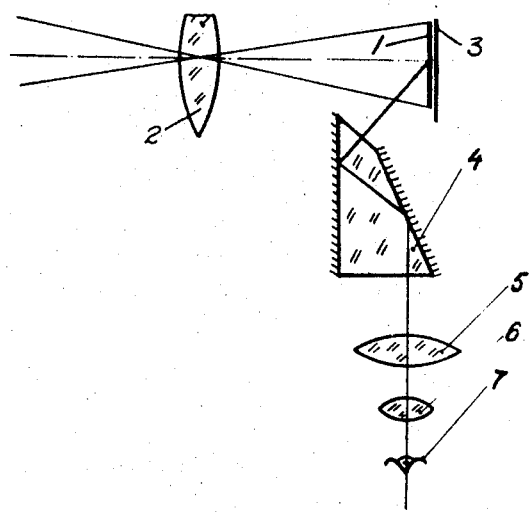

The invention relates a viewfinder, ensuring the efficient control in the picture-taking process, by direct visual observation of the original image, which appears at the surface of the photographic material.

In a camera, the viewfinder has the task of supplying visual data about the contents of the frame and the quality of the picture in the picture-taking process. The following kinds of viewfinders are known: (1) side viewfinder, with geometrical parallax; (2) viewfinders through a ground glass; (3) viewfinder through reflex shutter, with time parallax; (4) viewfinder through the film.

The known viewfinders possess a deficiency in common, namely that these finders do not allow the photographer to follow the initial image, such as is cast by the lens on the plane of the photographic material. With these viewfinders, the visual control is achieved either by means of an additional image which is obtained separately and thus differs from the original, both in content and in attribute—or by observing the initial picture, qualitatively altered because of the diffusion caused by the carrier of the sensitive layer through which the observation is performed. As a matter of fact, sighting through the film is no longer practical since modern negatives are provided with an antihalo layer, which is very opaque.

Consequently, these conventional viewfinders cannot supply actual data concerning the quality and the content of the picture in the photographic process. Operations which rely on viewfinder data are: measuring the distance from the camera to the object; periodical checking of the correspondence between the setting of the lens and the actual distance; checking coincidence of the ground glass plane with the plane of the photographic material; checking coincidence of the viewfinder frame with the exposure port frame; checking the stability of the film plane in motion and at rest; correcting the viewfinders with respect to geometrical parallax, etc.

The invention eliminates these deficiencies by ensuring the visual perception of the real image itself, without changes in shape or in contents, such as is cast by the lens on the sensitive layer of the photographic material, while the observation is performed by making use of the property of diffused reflection of this layer, the reflected picture being picked up by an optical device, which connects the picture and the observer's eye by an optical path.

The optical device consists in a prism with reflecting surfaces. The geometrical shape of the prism depends on the mutual position between the plane of the photographic material and the point of observation, which position is determined by the type of the camera. The limits for the angular rotation of the picture plane are 45° and 180°, according to the type of the camera.

In case certain constructive conditions prevent the prism from being located in the useful position, the prism may be replaced by reflecting surfaces mirror completed by optical correction elements.

Figure 2:
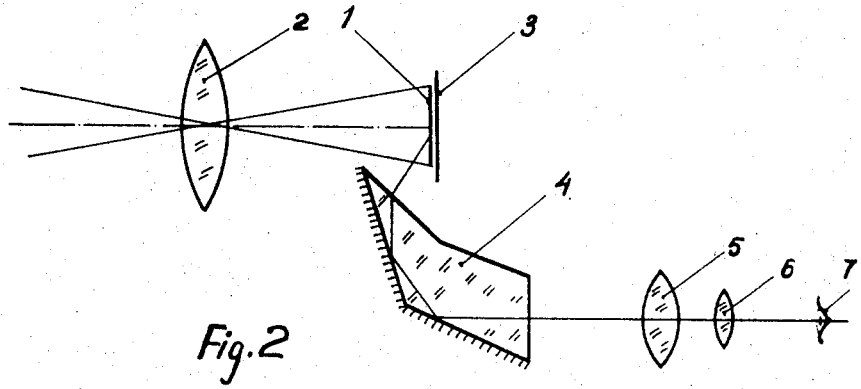
Figure 3:
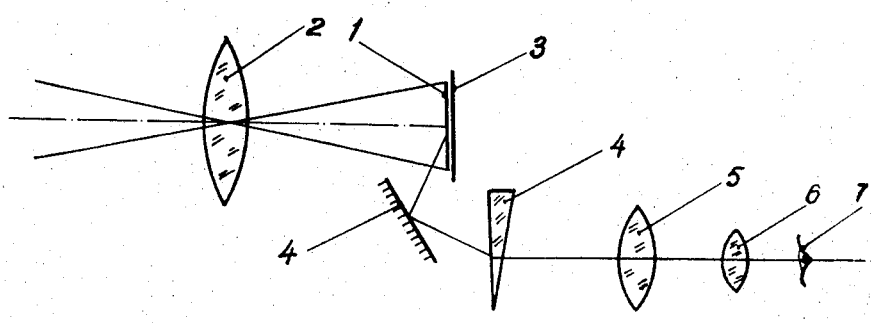

FIGURES 1, 2 and 3 show application examples of the viewfinder, the optical diagrams being taken as sections along a horizontal plane and containing the following: the picture 1, cast by the lens 2 on the surface of the photographic material 3, whence the reflected picture is taken over by the optical device 4, which generates an optical track connecting the picture 1 and the observer's eye 7, through the magnifying lens 5–6.

In the embodiment shown in FIG. 1, the picture is observed at rectangles (90°) to the photographic optical axis, the optical device 4 consisting in a prism provided with two side surfaces, the two long sides being reflecting surfaces. FIG. 2 pertains to the case, when the picture has to be observed from behind the camera, in which case the optical device 4 is a Leman-Spranger prism, which rotates the plane of the picture by 180°. In FIG. 3, the optical device comprises a mirror 4, with a corrector 4', designed to correct the deviation of the light rays—an example of which is the case where the observation point 7 must be provided with mobility in the horizontal plane. As the mirror is of tiny overall dimensions, this example may be applied to cameras which have little space for the exposure port.

The viewfinder according to the invention may be made use of alongside with the viewfinders existing on the same camera, the coexistence permitting that the new viewfinder should be employed by performing periodic optical checking, without it being necessary to put the camera out of production and send it to the checking laboratory, and without a collimator or another special checking device. This constitutes the main advantage of the viewfinder. Other advantages are:

The observation is performed without secondary picture (pseudo-picture);

The time parallax and the geometrical parallax are eliminated;

The measuring operations are eliminated without endangering the safety in production.

I claim:

1. A viewfinder for a photographic camera comprising, in combination with a camera objective adapted to cast an image in a photographic plane and a photographic layer disposed at said plane, magnifying objective-lens means offset from said plane and from the path of light rays from said camera objective to said layer and exposed to the eye of a viewer, and reflecting means between said magnifying objective-lens means and said plane and disposed in the path of light rays reflected from said layer for directing the reflected light rays through said magnifying objective-lens means.

2. A viewfinder as defined in claim 1 wherein said magnifying lens means has an optical axis at right angles to the optical axis of said camera objective and said reflecting means is a prism having a first reflective surface generally parallel to said plane for receiving the light rays reflected from said layer and a second reflective surface opposite said first reflective surface for reflecting light rays received from said first reflective surface along the optical axis of said magnifying objective lens means.

3. The viewfinder defined in claim 1 wherein said magnifying objective-lens means has an optical axis parallel to the optical axis of said camera objective and said reflecting means is a prism having a first reflective surface receiving light rays from said layer and a second reflective surface angularly adjoining said first reflective surface for reflecting light from said first reflective surface along the optical axis of said magnifying objective-lens means.

4. The viewfinder defined in claim 1 wherein said objective-lens means has an optical axis parallel to the path of light rays from said camera objective to said layer and said reflecting means includes a mirror adapted to reflect light rays reflected from said layer along said optical axis.

References Cited

UNITED STATES PATENTS

| | | | |
|---|---|---|---|
| 948,942 | 2/1910 | Gaut | 95—42 |
| 2,508,864 | 5/1950 | Lane | 88—1.5 |
| 3,181,445 | 5/1965 | Reymond | 95—42 |
| 3,250,195 | 5/1966 | Maitani | 95—42 |

NORTON ANSHER, Primary Examiner

W. A. SIVERTSON, Assistant Examiner

U.S. Cl. X.R.

88—1.5